Figure 1:
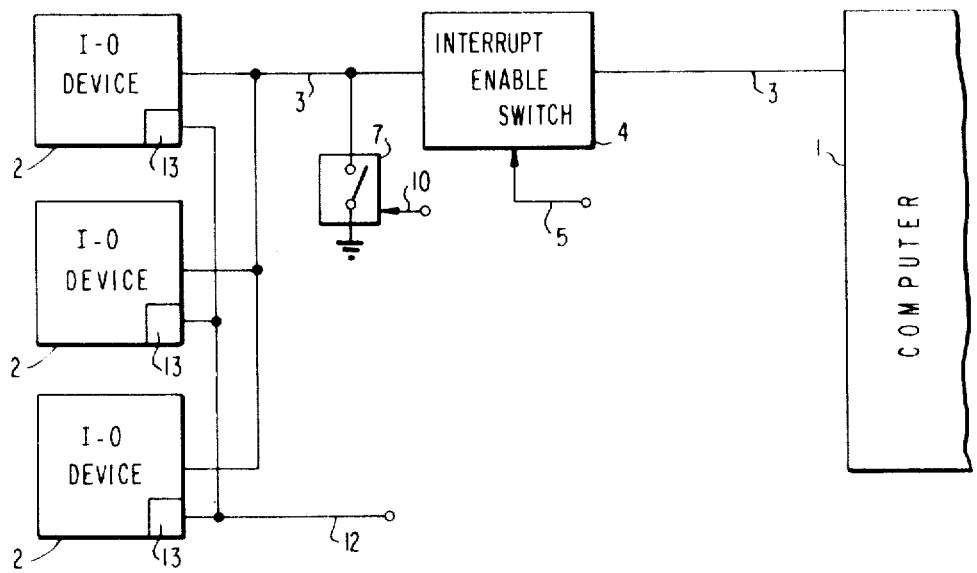

United States Patent

[11] 3,588,835

[72] Inventor Robert S. Enabnit
Akron, Ohio
[21] Appl. No. 807,239
[22] Filed Mar. 14, 1969
[45] Patented June 28, 1971
[73] Assignee The Goodyear Tire & Rubber Company
Akron, Ohio

[54] DEBUGGING OF ON-LINE DIGITAL COMPUTERS HAVING AN ACTIVE INTERRUPT
12 Claims, 2 Drawing Figs.
[52] U.S. Cl. .................................................. 340/172.5
[51] Int. Cl. .................................................. G06f 9/18
[50] Field of Search .......................................... 340/172.5;
235/157

[56] References Cited
UNITED STATES PATENTS
| | | | |
|---|---|---|---|
| 3,286,239 | 11/1966 | Thompson et al. | 340/172.5 |
| 3,373,408 | 3/1968 | Ling | 340/172.5 |

*Primary Examiner*—Raulfe B. Zache
*Attorney*—Beveridge and De Grandi

ABSTRACT: This invention involves methods and circuitry for debugging programmable digital computers having an active interrupt. An interrupt is automatically provided following each program instruction. Every interrupt interrogates input-output devices to determine which, if any, require service. Errors may be located by a debug routine which follows the interrogation. This invention allows the programmer to readily locate errors and work backwards to make the proper corrections.

INVENTOR
ROBERT S ENABNIT

DEBUGGING OF ON-LINE DIGITAL COMPUTERS HAVING AN ACTIVE INTERRUPT

This invention relates to a method and circuitry for debugging of online programmable digital computers. More specifically, this invention includes circuitry and an accompanying program for aiding in the location of operation and programming errors in the use of general purpose digital machines which are operated online with or without an active interrupt.

Debugging is a procedure for finding errors and making corrections in a previously written program. Errors may be caused by the programmer's failure to provide for all possible situations, logic mistakes, overlapping of memory locations, and so forth. Quite often, the first notice a programmer has that his program contains errors is where the computer simply fails to operate properly.

Without automatic debugging procedures, a programmer must usually attempt to locate errors in his program by reviewing it in logical block or instruction-by-instruction. This is a tedious and time consuming task if it must be done without access to the machine, as is often the case.

When the programmer does have access to a machine, an unsophisticated procedure is sometimes followed wherein the programmer simply loads the program and lets it run until the machine stops unexpectedly. Then, using the control console, the programmer may look for the error by interpreting the console lights. This approach is unsatisfactory for two reasons. First, by the time the machine stops, the error may have caused all pertinent information, including itself, to be either changed or eliminated. Secondly, the program error may cause the machine to run in an infinite loop and the machine would not stop until the programmer intervened.

Another, more sophisticated, approach is to formulate a debugging scheme beforehand and, by the use of the computer console, insert strategic halts in the program before it is run. After each halt, the programmer can examine various registers and, where necessary, alter their contents. In cases where errors fail to appear where expected, this console debugging approach is of little value. In addition, the difficulties of interpreting binary console displays and manipulating the high numbers of console switches necessary to correct a program in this approach often produce added errors.

To solve many of the problems mentioned above, debugging programs are written for controlling the operations which would normally be performed by the programmer if he used the console. Such a program allows the user to examine registers, change their contents, make corrections, make additions to the program, and so forth. In general, debugging programs allow the programmer to examine for errors and make corrections in the original language of the program listing, with all translation being performed by the debugging program.

Many digital computers are operated online, that is, they are continually ready to accept or provide data on demand. For example, a computer may be continually connected to a cathode ray tube, a teletype and a variety of process sensors. When one of the sensors generates data, normal computer operation is interrupted so that the newly sensed data may be read in.

As will be explained below, normal debugging procedures, as briefly described above, may not be used in online applications with an active interrupt. When an online computer is operating with an active interrupt, any input-output device may interrupt normal operation and require servicing at any time. Interrupts occur at random times so that it is impossible to predict the point in a program at which an interrupt will occur. It is, therefore, an object of this invention to provide a method and circuitry for debugging a program run on an online computer with an active interrupt.

It is another object of this invention to automatically interrupt a program after each instruction so that the correctness of the instruction and the machine operation may be determined.

It is still another object of this invention to examine the input-output devices following each interrupt to ascertain whether any need servicing before the debugging routine is effected.

It is yet another object of this invention to provide a delayed interrupt signal after every instruction to interrupt machine operation after the following instruction.

Figure 2:
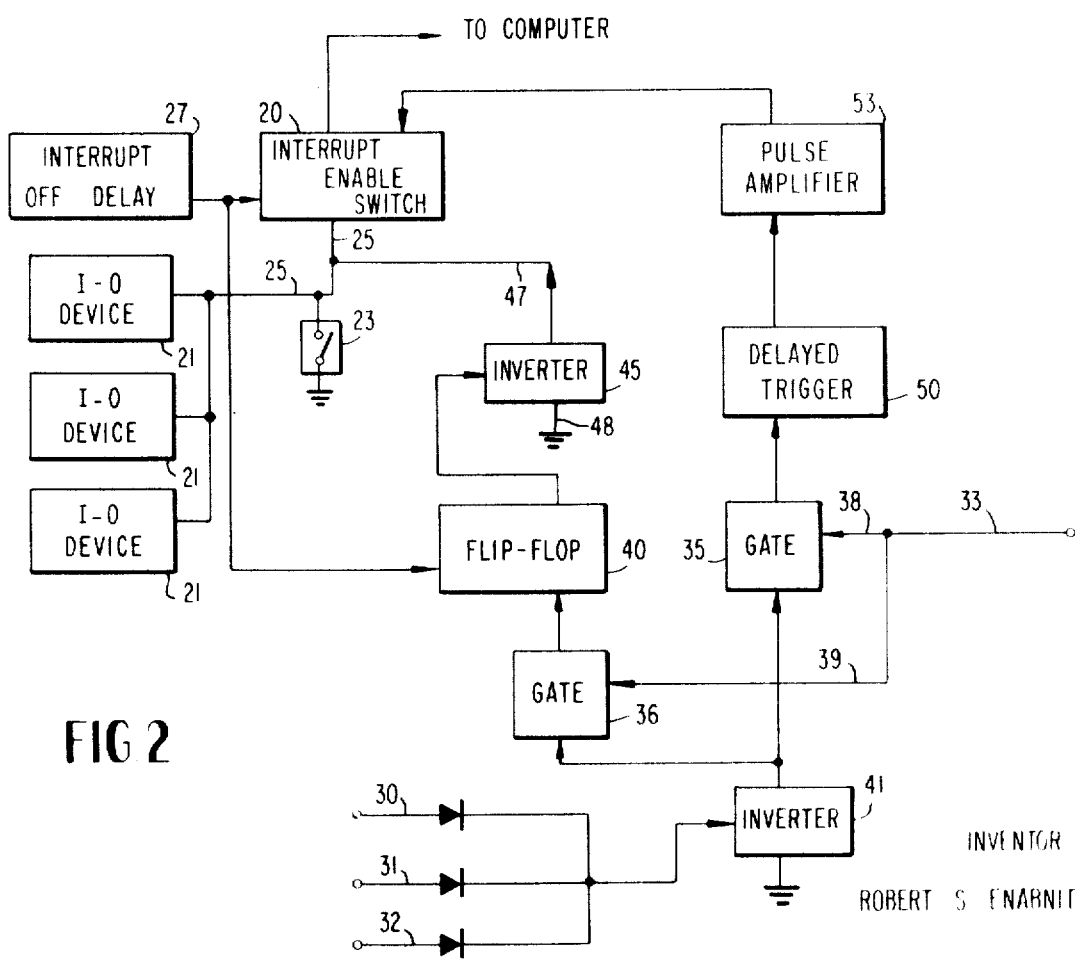

These and other objects of this invention will become clear by reference to the following specification and accompanying drawings, wherein:

FIG. 1 is a generalized block diagram for illustrating the interrupt function of online computers; and FIG. 2 is a block diagram of the circuit of this invention.

Referring to FIG. 1, a simplified block diagram of an online digital computer is shown for illustrating, in general terms, the interrupt feature of such computers. Computer 1 is connected to a plurality of input-output devices 2 via interrupt bus 3. Interrupt enable switch 4, controlled via line 5, directly connects the various input-output devices 2 with computer 1. When interrupt enable switch 4 is controlled to an "on" condition by line 5, the computer is operating with an active interrupt.

Generalized ground switch 7 selectively connects interrupt bus 3 to ground. When any of the input-output devices are ready to deliver or accept data to or from computer 1, ground switch control line 10 causes switch 7 to close, connecting interrupt bus 3 to ground. If interrupt enable switch 4 is on, the interrupt thereby being active, computer 1 interrupts operation of the main program and switches control to a previously stored interrupt service routine. The service routine, via line 12, interrogates unique logic block 13 in each of the input-output devices to determine which requires service. Depending upon which requires attention, a service subroutine, written for the particular device, provides the proper service.

Occasionally, more than one input-output device may require service at the same time. To handle such an eventuality, the service routine is written to provide priority service. In this way, input-output devices are always serviced one at a time.

It should be appreciated that the above description of FIG. 1 is general and for information purposes only. Interrupt bus 3, for example, may actually take the form of multiple lines rather than the single generalized line as is shown. In those cases, the service routine interrogates the multiple lines to determine which requires servicing. In the case of simultaneous servicing needs, the service routine is provided with priority instructions as to which line is to be serviced first.

In order to explain why normal program debugging procedures will not work in an online computer with active interrupt, it is necessary to understand the service operation of a computer without an active interrupt. The following explanation is of the service operation of an example computer and is for the purpose of explanation only. It should be appreciated that actual service procedures and operations will vary from machine to machine. It is not intended that the following example be considered as limiting this invention in any way.

In the example machine, if the interrupt bus is grounded at the time an instruction at address A is being performed, the A instruction operation is completed. Under the control of the service routine, the address of the following instruction, A+1, is transferred to the ϕϕϕϕ address (or other special address). At the same time, the interrupt enable switch is generally turned off. Following the transfer, the program counter increments and performs the instruction in address ϕϕϕ1. The instruction in address ϕϕϕ1 will direct a jump, directly or indirectly, to an address containing the beginning of the interrupt service routine. As explained above, the routine interrogates the input-output devices to determine which requires servicing and then, depending upon which does, executes the proper instructions. After the service is completed, the last instruction in the service routine is to jump to the address specified at ϕϕϕϕ,A+1, the address of the next instruction in line at the time of the interrupt. Control is thereby returned to the main program and the computer proceeds in normal fashion until the next random interrupt.

When the computer has an active interrupt, as explained above, normal debugging procedures are not available. This is because debugging procedures require communication with the computer via a teletype or similar device. For example, the operator may simply request that the computer type the contents of a specified memory location. If the operator attempts to use the teletype in this manner, the main program interprets the request as a normal interrupt and proceeds as explained above. The computer is incapable of recognizing the difference between a true input-output device interrupt and an interrupt caused by debugging.

According to this invention, an interrupt is provided during each instruction of the user's program. Circuitry discussed herein grounds the interrupt bus automatically for every main program instruction. The instruction being executed is completed and the address of the next instruction is transferred to address $\phi\phi\phi\phi$, as explained above, from which control is switched to the new debugging program which first interrogates the input-output devices to ascertain which need servicing.

If one of the input-output devices does need servicing and generates an interrupt, the next address is placed in address $\phi\phi\phi\phi$, or other special register, as explained above. Under the control of the debugging program, the address in address $\phi\phi\phi\phi$ is transferred to another location. Return from the regular service routine is to the address specified in address previously stored in $\phi\phi\phi\phi$, but now stored elsewhere by the debugging routine. During execution of this following instruction, the delayed "interrupt-on" pulse resets the interrupt enable gate and grounds the interrupt bus, and the process is repeated. In this fashion, an interrupt is provided following every main program instruction.

Referring to FIG. 2, a circuit capable of carrying out the method of this invention is shown. Interrupt enable switch 20 connects input-output devices 21 to a computer (not shown). Ground switch 23 connects interrupt bus 25 to ground when any of the input devices 21 require service.

Interrupt-off delay 27 turns enable switch 20 off after the need for service has been recognized and acted upon by the computer.

To generate the automatic interrupt-on pulse at the end of each instruction, the debug program includes a special four digit instruction. The interrupt-on instruction is received on leads 30, 31, 32, 33. The pulse on lead 33 opens gates 35, 36 via lines 38, 39. At the same time, pulses on leads 30, 31, 32 set flip-flop 40 through gate 36 and inverter 41. Flip-flop 40 then causes inverter 45 to ground interrupt 25 through line 47 and ground connection 48.

Although the interrupt bus is grounded at this point through inverter 45, the computer is now aware of the ground since interrupt enable switch 20 is open.

At the same time inverter 41 sets flip-flop 40, it pulses delayed trigger 50 through gate 35. The amount of delay time in trigger 50 is predetermined by the longest time required for the computer to execute a return to the user's program instruction. This allows the computer to execute each instruction completely before servicing an interrupt. In the example computer of this application, the amount of delay is approximately 3.2 microseconds. A longer delay would allow execution of more than one instruction if desired. It is also apparent that a program controlled delay could be envisioned to permit other combinations.

Following the appropriate delay, trigger 50 enables interrupt switch 20 through pulse amplifier 53. Since the interrupt bus has been previously grounded through inverter 45, the computer is now aware of the interrupt and proceeds under the control of the debugging program as described above.

The transfer back and forth between the main program and the debugging program continues throughout the run time of the main program. Control is transferred at the end of every instruction by the delay interrupt-on pulse generated by trigger 50.

In programming a debug operation according to this invention, the debugging always starts at the error and proceeds backwards through prior instructions. This is a substantial improvement over prior art methods of progressing through the entire program until an error is located. By use of the method of this invention considerable amounts of time and effort are saved since the programmer avoids having to deal with nearly all of the valid portions of the program.

In the program disclosed in this specification, two types of debugging have been provided. The first, logic debugging entails loading the sequence of addresses through which the program will advance into memory via the debugging program. At every point desired by the programmer, the debug program controls a comparison between the address at which the computer actually is operating to the address at which the programmer predetermined the computer should be. If an error is present, the debug program controls a printout of the last instruction and the six prior instructions leading up to the error. In this fashion, an error in logic is readily located.

The second type, error debugging, comprises comparing the actual contents of addresses or registers to a stored value which the programmer predetermined irrelevant at a given instruction. The predetermined value may be either the actual number which should be present or a range of values in which the computed number should fall.

Following is the particular program written to carry out the methods of this invention. The language is PAL-III symbolic. It should be recognized that the methods of this invention may be carried out in countless variations of the hundreds of present computer languages. The following program should not be considered as limiting this invention in any fashion. Rather, the scope of the invention is limited solely by the appended claims.

Line 1 of the instructions, containing *XXXX, simply denotes the initial address to be occupied by the debug program which follows.

```
*XXXX
SAV1,
INITIAL,KCC/CLEAR FLAGS
IOJMP,TAD 1
NEWTEST,DCA SAV1/SAVE CONT. ADDR. 1 & 2
VAR,JMP I VAL/GET SPEC INSTRUC.
VAL,TABLE
ACC,JMP I IOSAV/LOAD PROG IOSERV RETURN
LINK,φ
PFLAG,φ
IOSAV,φ
TESTIND,NOP
STORE,NOP
SAWORD, WORD
SETUPS,SETUP
LPROGS,LPROG
IPROG,JMS I SETUPS/GET VARIABLE
DCA VAR
JMS I SETUPS/NEXT GET VALUE
DCA VAL
JMS I SETUPS/GET TEST
DCA TESTIND
NEWRET,TAD TESTIND/IS IT TEST φ?
SZA CLA
JMP CONTINUE/NO, GO ON WITH TEST
JMS I SETUPS/YES
DCA I VAR/SET INITIAL VALUE OF VARIABLE
JMP CONTINUE
ADDRS,ADDR
TB12S,TABLE+14
CHECK,DCA ACC/SAVE ACC
RAR
DCA LINK/SAVE LINK
SERVICE,SCF/IS THERE A PROG. FLAG?
JMP .+2
JMP FLG
KSF
JMP .+2
JMP FLG
TSF
```

```
JMP .+2
JMP FLG
NOP/USER DEF. FLAG
JMP .+2
JMP FLG
NOP/USER DEF. FLAG
JMP .+11
FLG,TAD PFLAG/IOSTATUS=ION?
SNA CLA
JMP TEST/NO, DO NOT USE IOSERVICE
DCA PFLAG/YES CLEAR IOSTATUS FLAG
TAD φ/SAV φ IF PROG GOES TO IOSERV
DCA IOSAV
6φφφ/INTERR DELAY ON
JMP SAV1/JMP TO PROG IOSERV
TEST,TAD φ
DCA I TB12S
TAD TESTIND/WHICH TEST?
SNA
JMP TESTφ
IAC CLL
SZA CLA
JMP TEST1
JMP I TESTLS
TESTLS,TESTL
TEST0, I VAR
CIA
TAD VAL
TPφ,SZA CLA
JMP CONTINUE/TEST OK
JMP I OUTPUS/BAD, OUTPUT RESULTS
TEST1,VAR/IS THIS THE ADDRESS?
CIA
TAD φ/CHECK ADDR
SZA CLA
JMP CONTINUE/NOT YET
TAD ACC/ADDR FOUND, NOW CHECK ACC
CIA
TAD VAL
TP1,SNA CLA
JMP I OUTPUS/BAD, OUTPUT
CONTINUE,CLA
TAD Iφ/CHECK INTERR & JMP & JMS
TAD M1776
SZA
JMP .+3/NOT IOF 6φφ2
DCA PFLAG/RESET INTERR FLAG
ISZ φ
IAC/CHECK ION
SZA
JMP .+3/NOT ION 6φφ1
ISZ PFLAG/SET INTERR FLAG
ISZ φ/SKIP ION
OSR/GO INTO TABLE?
IAC
SZA CLA/YES SAVE
JMP OMIT
TAD φ/GET ADDR NEXT INSTRUC.
JMS I UPDATS/PUT IN TABLE
TAD ACC/GET ACCUM
JMS I UPDATS/PUT IN TABLE
OMIT,TAD LINK/RESTORE STATUS
CLL RAL
TAD ACC
6φφφ
JMP Iφ/GO BACK FOR MORE
M1776,1776
UPDATS,UPDATE
OUTPUS,OUTPUT
NEWDATA,TAD TESTIND/SET UP NEW INSTRUCT.
SZA CLA
JMP .+4
TAD STORE
DCA TPφ
JMP .+3
TAD STORE
DCA TP1
ISZ NEWTEST
JMP NEWRET
START,TAD SAWORD/SET OUTPUT WORD ADDR
DCA I ADDRS
JMS I SETUPS/GET SA PROG.
DCA φ
JMS I SETUPS
SNA /PROG?
JMP IPROG/INSTRUC.
CIA
DCA TESTIND/SET IND. TO 7777NFOR LOG.
ISZ NEWTEST/SET NEWTEST FOR EXIT
WORD,JMP I LPROGS
212
323/S
215
212
32φ/P
3φ1/A
3φ4/D
3φ4/D
326/V
3φ1/A
314/L
324/T
323/S
324/T
323/S
3φ5/E
324/T
ALPHA, 314/L
LPROG,TAD OTBL
DCA I ADDRI
DCA TCOUNT/INIT. TOT. INPUT COUNT
TAD LTABB
DCA LOCATE
TAD TABWDS/INIT TABLE SIXE COUNTER
DCA COUNTER
DCA POINTER/SET LOG POINTER
JMS I SETS/NOW CALL LIMITS
JMS SPEC
JMS I SETS/CALL LOG LINE 1
JMS SPEC/PUT LAST LINE WORD IN TABLE
JMS I SETS/GET LOG LINE 2
JMS SPEC
TAD TCOUNT/TABLE WORDS A COUNTER
CIA
DCA TCOUNT
JMP I CONT/NOW START
TESTL,ISZ LOCATE
TAD I LOCATE
SNA CLA
JMP I OUTP/NEXT IS φ
TAD LTABAD/INIT. TABLE ADDR
DCA LOCATE
TAD TCOUNT/SET TABLE WORD COUNTER
DCA COUNTER
TAD φ
TAD LO/CHECK LO (COMPL)
SZL CLA
TAD φ
TAD HI/L=1, LO OK,CHECK HI
SNL CLA
JMP I OUTP
TAD I LOCATE/GET ADDR.
TAD φ/GET ADDR.
SNA CLA/SAME?
JMP FOUND/YES
MORE,ISZ LOCATE
ISZ COUNTER/INCR. COUNTER
JMP .-6/LOOKAGAIN
JMP I CONT/NOT FOUND
FOUND,TAD COUNTER/REM. COUNT(COMPL)
```

```
CIA/MAKE VALUE                              TCF
TAD TCOUNT/ADD COMP. TABLE                  JMP I TYPE
TAD POINTER/ADD POSITION                    K3,7775
SPA                                         K4,7774
JMP I OUTP                                  SLASH, ϕ257
SZA CLA/=POINTER?                           NEWDAS,NEWDATA
JMP MORE/NO,BEHIND                          TBL1,
ISZ POINTER/YES                             SETUP,  NOW READY FOR DATA
TAD ϕ                                       TAD K3
DCA CORRECT/SAVE THIS ONE                   DCA COUNT4
JMP I CONT/CONTINUE                         BACK,TAD I ADDR/TYPE OUT QUERY
LOCATE, ϕ                                   JMS TYPE
TYPIT, OUTIT                                ISZ ADDR
OTBL,ALPHA                                  ISZ COUNT4
LTABAD,LTABLE                               JMP BACK
CONT,CONTINUE                               TAD SPACE
TCOUNT, ϕ                                   JMS TYPE
ADDRI,ADDR                                  READ,DCA I STORES/CLEAR STORE WORD
SETS,SETUP                                  KSF/READ KB
LTABB,LTABLE-2                              JMP .-1
TABLE,TAD I IOSTRUC/PUTS PROG RETURN AFTER  KRB
   SAV1                                     DCA CHAR
DCA I MOVE                                  TAD CHAR
TAD K1                                      JMS TYPE
DCA 1                                       TAD CHAR
TAD K 2                                     CIA
DCA 2                                       TAD SLASH
JMP CALL                                    SPACE,SZA
IOSTRUC,ACC                                 JMP .+13/NO
MOVE,IOJMP                                  TAD I TESTPS/7777=LOG PROG
K1,JMP I 2                                  SMA CLA
K2, CHECK                                   JMP .+4/NOT LOGIC
NOP                                         TAD I STORES
NOP                                         JMS I SPECS
CORRECT, ϕ                                  JMP READ
TABWDS,-26                                  TAD I STORES/YES
POINTER, ϕ                                  DCA I TESTPS
OUTP,OUTPUT-1                               DCA I NEWTST
SPEC,START                                  JMP READ
CIA                                         TAD MCR/END THIS INFO
DCA I LOCATE/PUT COMPL. IN LOGIC TABLE      SNA CLA
ISZ LOCATE/INCR. ADDR.                      JMP LAST/YES
ISZ TCOUNT/INCR. TABLE COUNTER              CONV,TAD I STORES/NO, ADD TO STORE
ISZ COUNTER/OVFLO SIZE                      RTL CLL
JMP I SPEC/NEXT CHAR                        RAL CLL
JMP I CONT/OVFLO, GO TEST                   TAD M26ϕ
LO, 215                                     TAD CHAR
HI, 212                                     DCA I STORES
LTABLE, 317/0                               JMP READ+1
325 /U                                      MCR,-257+215
324/T                                       LAST,TAD I NEWTST/NEW TEST?
32ϕ/P                                       SNA CLA
24ϕ/SP                                      LF,JMP I NEWDAS/YES
323/S                                       TAD LF
3ϕ1/A                                       JMS TYPE
CALL, TAD LTABB                             TAD I STORES
DCA CALL                                    JMP I SETUP
TAD I CALL                                  NEWTST,NEWTEST
SPA                                         STORES,STORE
JMP .+4                                     M26Φ,-26Φ
JMS I TYPER                                 TESTPS,TESTIND
ISZ CALL                                    STA
JMP .-5                                     OUTPUT,TAD COUNT/DUMP TABLE
CLA CLL                                     DCA COUNT2
TAD OUTP                                    LOOP,TAD IND1
JMS I TYPIT                                 SNA CLA
JMP I SPEC                                  JMP .+6
TYPER,TYPE                                  DCA IND1
COUNTER, ϕ                                  TAD CR
POINT,                                      JMS TYPE
TYPE, ϕ                                     TAD LF
TLS                                         JMP .+3
TSF                                         ISZ IND1
JMP .-1                                     TAD SLASH
M7ϕϕϕ, CLL CLA                              JMS TYPE
```

```
TAD I SATABLE/ENTER SUB WITH TABLE WORD
JMS OUTIT
TAD I TB12
JMS UPDATE
ISZ COUNT2
JMP LOOP
JMP I STARTS
TBL2,
OUTIT,Φ/OUTPUT WORD ROUTINE
DCA THIS
RETURN,TAD K4/RESET OUTPUT DIG COUNT
DCA C 4
TAD THIS
AND M7ΦΦΦ
CLL RTL
RTL
TAD C26Φ
JMS TYPE
TAD THIS/UPDATE WORD
RTL CLL
RAL CLL
DCA THIS
ISZ C4
JMP RETURN +2
JMP I OUTIT
COUNT4,
COUNT2,Φ
C4,
CHAR,Φ
C26Φ, 26Φ
CR, 215
ADDR, IND1, Φ
STARTS,START
THIS,
UPDATE,Φ
DCA I TB12
TAD COUNT
DCA POINT
TAD SATABLE
DCA TB1
OVER,TAD TBL1
IAC
DCA TBL2
TAD I TBL2
DCA I TBL1
ISZ TBL1
ISZ POINT
JMP OVER
JMP I UPDATE
SATABLE, TABLE
TB12, TABLE+14
COUNT, 7763
SPECS,SPEC
```

I claim:

1. In a circuit for automatically interrupting operation of a digital computer having input-output devices connected to the computer by at least one interrupt bus through an enabling switch, the combination of:
 means for sensing an interrupt-on instruction for initiating an automatic interrupt;
 means responsive to said sensing means for generating a control signal at a predetermined time after an interrupt-on instruction is sensed by said sensing means; and
 means for closing said enabling switch under control of said control signal.

2. A circuit as claimed in claim 1, further comprising second means responsive to said sensing means for connecting an interrupt bus to a predetermined voltage level.

3. A circuit as claimed in claim 2, wherein said sensing means comprises;
 a plurality of code lines for receiving all pulses except one of an interrupt-on instruction;
 inverter means connected to said lines for receiving said pulses;
 first and second gate means connected to the output of said inverter means; and
 a code line for receiving the remaining pulse of an interrupt-on instruction and controlling the conduction state of each of said gate means.

4. A circuit as claimed in claim 2, wherein said second responsive means comprises:
 flip-flop means controlled to one state by said sensing means, and
 inverter means connected to the output of said flip-flop means, to said interrupt bus and said predetermined level for selectively connecting said interrupt bus to said predetermined level under control of said flip-flop means.

5. A circuit as claimed in claim 2, wherein said responsive means comprises:
 delayed trigger means responsive to said sensing means for generating a control pulse at a predetermined time after an interrupt-on instruction is sensed by said sensing means; and
 means for connecting said control pulse to said enabling switch.

6. A circuit as claimed in claim 5, wherein said connecting means comprises a pulse amplifier.

7. A circuit as claimed in claim 3, wherein:
 said second responsive means comprises:
  flip-flop means controlled to one state by said first gate means and inverter means connected to the output of said flip-flop means, to said interrupt bus and said predetermined level for selectively connecting said interrupt bus to said predetermined level under control of said flip-flop means;
 said responsive means comprises:
  delayed trigger means responsive to said second gate means for generating a control pulse at a predetermined time after an interrupt-on instruction is sensed by said sensing means; and
  means for connecting said control pulse to said enabling switch.

8. A circuit as claimed in claim 7, wherein said connecting means comprises a pulse amplifier.

9. In a method of debugging the operation of a computer having at least one interrupt bus connecting input-output devices to the computer through an enabling switch, the steps of:
 sensing an interrupt-on instruction in the program;
 generating a delayed control signal at a predetermined time after sensing an interrupt-on instruction; and
 closing said enabling switch at the time of generation of said delayed control signal under control of said signal.

10. The method of claim 9, further comprising the steps of:
 generating a second control pulse at the time of sensing an interrupt-on instruction; and
 connecting an interrupt bus to a predetermined level at the time of generation of said second control pulse under control of said pulse.

11. In a method for controlling debugging in a digital computer having an active interrupt, the steps of:
 communicating to the computer an interrupt-on instruction;
 controlling the generation of a delayed interrupt signal a predetermined length of time after communication of said interrupt-on instruction to said computer; and
 controlling the computer to initiate an interrupt sequence upon generation of said delayed interrupt signal.

12. In the method of claim 11, the additional step of controlling an interrupt on condition upon communication to the computer of said interrupt-on instruction.